United States Patent
Lin

(10) Patent No.: US 11,714,758 B2
(45) Date of Patent: *Aug. 1, 2023

(54) CACHE MANAGEMENT FOR SEARCH OPTIMIZATION

(71) Applicant: Kinaxis Inc., Ottawa (CA)

(72) Inventor: Angela Lin, Kanata (CA)

(73) Assignee: Kinaxis Inc., Ottawa (CA)

( * ) Notice: Subject to any disclaimer, the term of this patent is extended or adjusted under 35 U.S.C. 154(b) by 430 days.

This patent is subject to a terminal disclaimer.

(21) Appl. No.: 17/161,785

(22) Filed: Jan. 29, 2021

(65) Prior Publication Data

US 2021/0149814 A1    May 20, 2021

Related U.S. Application Data

(63) Continuation of application No. 16/264,855, filed on Feb. 1, 2019, now Pat. No. 10,936,501.

(51) Int. Cl.
*G06F 12/0895* (2016.01)
*G06F 12/0897* (2016.01)

(52) U.S. Cl.
CPC ...... *G06F 12/0895* (2013.01); *G06F 12/0897* (2013.01); *G06F 2212/1024* (2013.01); *G06F 2212/608* (2013.01)

(58) Field of Classification Search
CPC ............. G06F 12/0895; G06F 12/0897; G06F 2212/608; G06F 2212/1024
See application file for complete search history.

(56) References Cited

U.S. PATENT DOCUMENTS

| | | | |
|---|---|---|---|
| 5,829,038 A | * | 10/1998 | Merrell ............... G06F 12/0811 711/143 |
| 6,453,319 B1 | | 9/2002 | Mattis et al. |
| 6,766,418 B1 | | 7/2004 | Alexander et al. |
| 8,549,225 B2 | | 10/2013 | Blinick et al. |
| 8,635,402 B2 | | 1/2014 | Torii |

(Continued)

OTHER PUBLICATIONS

International Patent Application No. PCT/CA2020/050104, International Preliminary Report on Patentability dated Aug. 12, 2021.

(Continued)

*Primary Examiner* — David Yi
*Assistant Examiner* — Alan Otto
(74) *Attorney, Agent, or Firm* — Borden Ladner Gervais LLP; Curtis Behmann

(57) ABSTRACT

A method to store a data value onto a cache of a storage hierarchy. A range of a collection of values that resides on a first tier of the hierarchy is initialized. The range is partitioned into disjointed range partitions; a first subset of which is designated as cached; a second subset is designated as uncached. The collection is partitioned into a subset of uncached data and cached data and placed into respective portions. The range partition to which the data value belongs (i.e. the target range partition) is identified as being cached. If the cache is full, the target range partition is divided into two partitions, the partition that excludes the data value is designated as uncached; the values therein are evicted. If the cache has space, the data value is copied onto the cache; otherwise the division/eviction are repeated until the cache has space.

12 Claims, 7 Drawing Sheets

(56) References Cited

U.S. PATENT DOCUMENTS

| | | |
|---|---|---|
| 9,063,877 B2 | 6/2015 | Nakase |
| 9,355,109 B2 | 5/2016 | Archak et al. |
| 9,684,593 B1 | 6/2017 | Chen et al. |
| 10,996,857 B1 | 5/2021 | Yang et al. |
| 2014/0297964 A1* | 10/2014 | Nakase ............... G06F 12/1009 711/136 |
| 2016/0124858 A1 | 5/2016 | Koka et al. |
| 2019/0018786 A1 | 1/2019 | Beard et al. |
| 2019/0188156 A1 | 6/2019 | Sampathkumar et al. |

OTHER PUBLICATIONS

International Search Report from corresponding international application No. PCT/CA2020/050104.

U.S. Appl. No. 16/264,855 Notice of Allowance dated Dec. 30, 2020.

U.S. Appl. No. 17/165,442, Non-Final Office Action dated Jun. 20, 2022.

* cited by examiner

CACHE MANAGEMENT FOR SEARCH OPTIMIZATION

CROSS-REFERENCE TO RELATED APPLICATIONS

This application is a continuation of U.S. patent application Ser. No. 16/264,855, filed Feb. 1, 2019, which is hereby incorporated by reference.

TECHNICAL FIELD

The present disclosure relates generally to search optimization; and in particular, to cache management for search optimization.

BACKGROUND

Computer storage is separated into a data storage hierarchy based on response time. The performance of a computer is affected by the response time of the data storage. For example, a hierarchy of 'N' tiers can be designated as tiers $m_1, m_2, \ldots m_N$, where tier $m_i$ storage is faster to access than tier $m_{i+1}$. An example storage hierarchy includes processor cache at tier 0, random access memory (RAM) at tier 1, and disk at tier 2.

While executing instructions of a program, a processor stores a collection of data values in the computer storage. The collection of data values is often dynamic—that is, the program adds new data values to the collection from time to time. In addition, the processing system also includes a memory subsystem (e.g. RAM) that itself may be organized into a storage hierarchy comprising one or more tiers, where the processor can access upper tiers faster than lower tiers. The memory subsystem often contains a subset of the collection of data values.

As an example, table indexes and field indexes are a collection of data values. The processor accesses table indexes and field indexes to perform operations. The operations include adding a value to the index and searching for a value in the index. Additionally, the program frequently instructs the processor to search for a value that does not even exist in the index.

However, it may not be feasible to store the entire collection solely in the fastest storage tier for a number of reasons. First, the fastest storage tier may be too small to store the entire collection of data values. Furthermore, the fastest storage tier may comprise volatile memory (e.g. RAM) that does not persist, i.e. data in the memory is lost when the program is restarted, or the computer is shut down.

In general, a program (as executed by the processor) needs to determine whether a data value is already in a collection (of data values) or not. Conventional approaches for this determination are slow, due to the requirement to search through a slow tier of storage. There is a need to improve the speed of searching.

This system improves the speed of searching by using one or more faster storage tiers as a cache and reducing the required number of accesses to slower tiers of storage. The complete collection may be stored in one or more slower storage tiers. A subset of the collection may be copied into the cache.

Most caching strategies optimize for search hits but fail to optimize for search misses. Furthermore, traditional disk-based databases use index paging buffer pool strategies. These, however, do not work for representation of indexes that are not page-organized.

SUMMARY

In accordance with one embodiment, a data value location determination method comprising: initializing, by a processor, a range of a collection of data, wherein the collection of data resides on a first storage device that is in a tier slower than a fastest tier of a storage hierarchy; partitioning, by the processor, the range into a plurality of disjointed range partitions, wherein a first subset of the plurality of disjointed range partitions is designated as cached and second subset of the plurality the disjointed range partitions is designated as uncached; partitioning, by a processor, the collection of data into a subset of uncached data and cached data; copying, by the processor, the subset of the collection which lies in the one or more cached range partitions into a cache, wherein the cache resides on a second storage device that is in a tier faster than the tier of the first storage device; determining, by the processor, a target range partition to which the value belongs, wherein the target range partition has a target range; determining by the processor if the target range partition is cached or uncached; when the target range partition is cached, searching, by the processor, the cache to determine if the value is located in the cache; and when the target range partition is uncached, searching, by the processor, the uncached data to determine if the value is located on the first storage device.

In accordance with another embodiment, a computer system comprising a processor coupled to a computer-readable memory unit, the memory unit comprising instructions that when executed by the processor executes a data value location determination method comprising: initializing, by a processor, a range of a collection of data, wherein the collection of data resides on a first storage device that is in a tier slower than a fastest tier of a storage hierarchy; partitioning, by the processor, the range into a plurality of disjointed range partitions, wherein a first subset of the plurality of disjointed range partitions is designated as cached and second subset of the plurality the disjointed range partitions is designated as uncached; partitioning, by a processor, the collection of data into a subset of uncached data and cached data; copying, by the processor, the subset of the collection which lies in the one or more cached range partitions into a cache, wherein the cache resides on a second storage device that is in a tier faster than the tier of the first storage device; determining, by the processor, a target range partition to which the value belongs, wherein the target range partition has a target range; determining by the processor if the target range partition is cached or uncached; when the target range partition is cached, searching, by the processor, the cache to determine if the value is located in the cache; and when the target range partition is uncached, searching, by the processor, the uncached data to determine if the value is located on the first storage device.

In accordance with yet another embodiment, a computer program product, comprising a computer readable hardware storage device storing a computer readable program code, said computer readable program code comprising an algorithm that when executed by a processor of a computing device implements a data value location determination method comprising: initializing, by a processor, a range of a collection of data, wherein the collection of data resides on a first storage device that is in a tier slower than a fastest tier of a storage hierarchy; partitioning, by the processor, the range into a plurality of disjointed range partitions, wherein a first subset of the plurality of disjointed range partitions is designated as cached and second subset of the plurality the disjointed range partitions is designated as uncached; partitioning, by a processor, the collection of data into a subset of uncached data and cached data;

copying, by the processor, the subset of the collection which lies in the one or more cached range partitions into a cache, wherein the cache resides on a second storage device that is in a tier faster than the tier of the first storage device; determining, by the processor, a target range partition to which the value belongs, wherein the target range partition has a target range; determining by the processor if the target range partition is cached or uncached; when the target range partition is cached, searching, by the processor, the cache to determine if the value is located in the cache; and when the target range partition is uncached, searching, by the processor, the uncached data to determine if the value is located on the first storage device.

In some embodiments, when the value is not located on the first storage device (i.e. not in the collection), and the target range partition is cached: the method further comprises i) inserting, by the processor, the value into the cache if the cache has space and copying the value onto the first storage device; or ii) adjusting, by the processor, one or more of the disjointed range partitions if the cache is full; and copying, by the processor, the value onto the first storage device; and when the target range partition is uncached, inserting, by the processor, the value onto the first storage device.

In some embodiments, when the target range partition is cached and the cache is full, the processor evicts one or more values written in the cache; and the value is copied by the processor into the cache.

In some embodiments, the cache resides in the fastest tier of the storage hierarchy.

In some embodiments, the first storage device is a disk.

In some embodiments, search optimization is made more efficient by holding a subset of the collection (of data values) in cache according to a range partition rule. Such a system reduces the number of times the processor needs to access the disk to search for data values, particularly for search misses. It also solves the poor performance problem for using indexes that are not completely held in memory. The processing system thereby reduces the number of disk accesses, which results in faster search speed.

In some embodiments, the speed of searching is improved by using one or more faster storage tiers as a cache and reducing the required number of accesses to slower tiers of storage. The complete collection may be stored in one or more slower storage tiers. A subset of the collection may be copied into the cache.

In some embodiments, the speed of searches of a collection of values stored on a disk is improved, where it is equally important to maximize both the speed of searching for values that are in the collection (a hit) and the speed of searching for values that are not in the collection (a miss).

In some embodiments, the in-memory and on-disk representation of an index are both not page-organized. For example, the in-memory representation of the index can be a b-tree, while the on-disk representation of an index can be an LSM tree.

Most caching strategies optimize for search hits but fail to optimize for search misses. Furthermore, traditional disk-based databases use index paging buffer pool strategies. These, however, do not work for representation of indexes that are not page-organized.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF DRAWINGS

The foregoing and other advantages of the disclosure will become apparent upon reading the following detailed description and upon reference to the drawings. The use of the same reference symbols in different drawings indicates similar or identical items.

DETAILED DESCRIPTION

Figure 1:
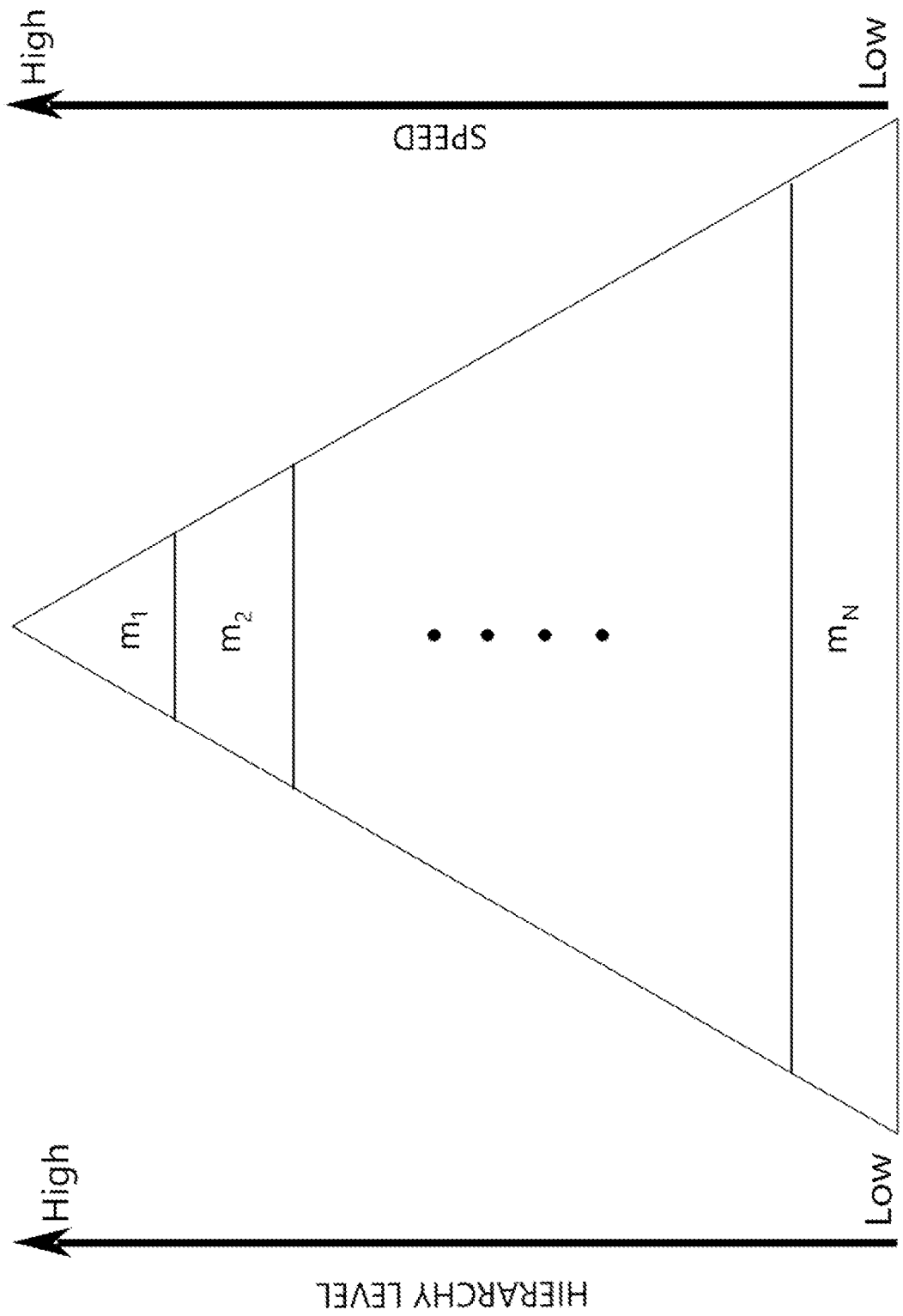
FIG. 1 illustrates a schematic of a computer storage hierarchy.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

A data storage hierarchy of 'N' tiers can be designated as tiers $m_1, m_2, \ldots m_N$, in which each tier $m_i$ is faster than tier $m_{i+1}$. Henceforth, the faster the storage $m_i$, the higher its place in the hierarchy, as illustrated in FIG. 1

While specific embodiments of the data storage hierarchy are discussed below, the methods and systems described herein apply to any type of storage hierarchy in which searching of data values in a slower tier of the hierarchy is minimized by searching a subset of those data values stored in a faster tier of the hierarchy.

In some embodiments, a disk may be a slower tier of a storage hierarchy in relation to a cache. A disk may have a large collection of values stored thereon. The values have a sorting order (note that the values are not necessarily stored in sorted order). The collection may also grow dynamically, in that values may be added to the collection.

Searching for a particular value on disk is very slow. In order to speed up the search, a partial copy (i.e. a subset) of the collection can be kept in cache, where the cache is located in memory. However, since the size of the cache is limited, it may not be possible to copy the entire collection into the cache.

Figure 2:
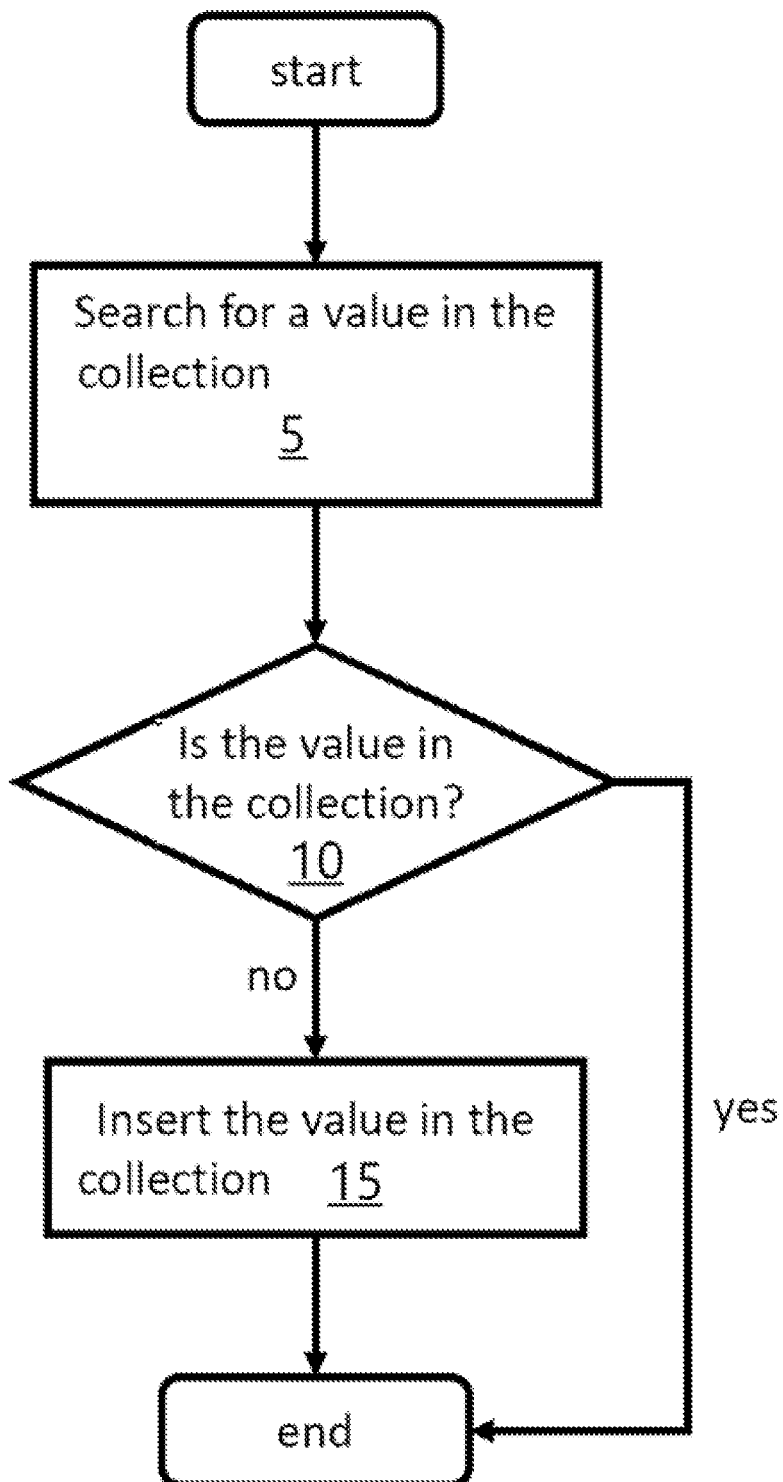
FIG. 2 illustrates a master flow chart that demonstrates the logic of an embodiment of the system.

FIG. 2 illustrates a master flow chart that demonstrates the logic of an embodiment of the system with the aim of determining if a data value 'X' (where 'X' is an arbitrary value) is in a collection of data values on disk (5). A processor—in the course of operation—will determine if the value 'X' is found in the collection on disk (10). If it is, then the search ends. If it is not, then the value is added (15) to the collection. As will be shown below, determining if 'X' is in the collection on disk does not necessarily mean that the disk will need to be searched.

In an embodiment, the system comprises a computer disk that stores the collection of data values; a cache (which is a portion of RAM) that stores a subset of the collection of data values; and a "cache invariant", which is a cache management protocol that determines whether a data value in the collection should also be stored in the cache.

In addition, the processor executes a computer program that implements the following procedures: a search procedure, which searches for data values in the collection, that consults both the cache and the collection on the computer disk; and an insertion procedure, which inserts data values into the collection, while maintaining the cache invariant.

The cache invariant is defined in terms of "range partitions". The full range of possible values in the collection can be partitioned into one or more disjoint sub-ranges, or "range partitions". One or more of the range partitions can be designated as cached. The remaining range partitions are designated as uncached.

Figure 3:
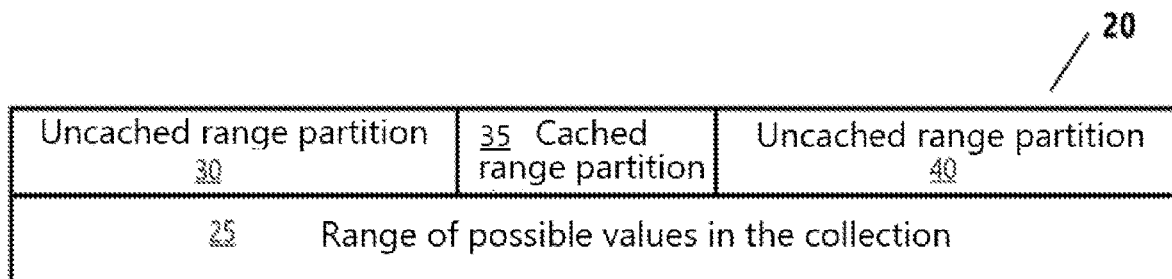
FIG. 3 illustrates an embodiment of the system in which a range of values of a collection (25) is partitioned into a cached and uncached range partitions.

An example (20) of range partitions is illustrated in FIG. 3, in which a range of possible values in the collection (25) is partitioned into a cached range partition (35) and two uncached range partitions (30, 40). There can be other combinations of cached and uncached range partitions.

As an example, if the collection stores data values from 1 to 100, range partitions may be [1,50], [51,80], and [81,100]. The full range of values in the collection is [1,100]. Each range partition is designated as cached or uncached.

The cache is populated according to a cache invariant. In an embodiment, the cache invariant specifies that for any value 'X' in a cached range partition, the value 'X' is in the cache if and only if the value is in the on-disk collection. If 'X' is in an uncached range partition, then the value is not copied into the cache.

That is, when ranges of the cached/uncached range partitions are first initialized, the cache contents can be initialized by copying portions of the collection into the cache. If the collection is initially empty, then nothing is copied. As the collection grows dynamically, new values are added/not added to the cache according to some embodiments.

Figure 4:
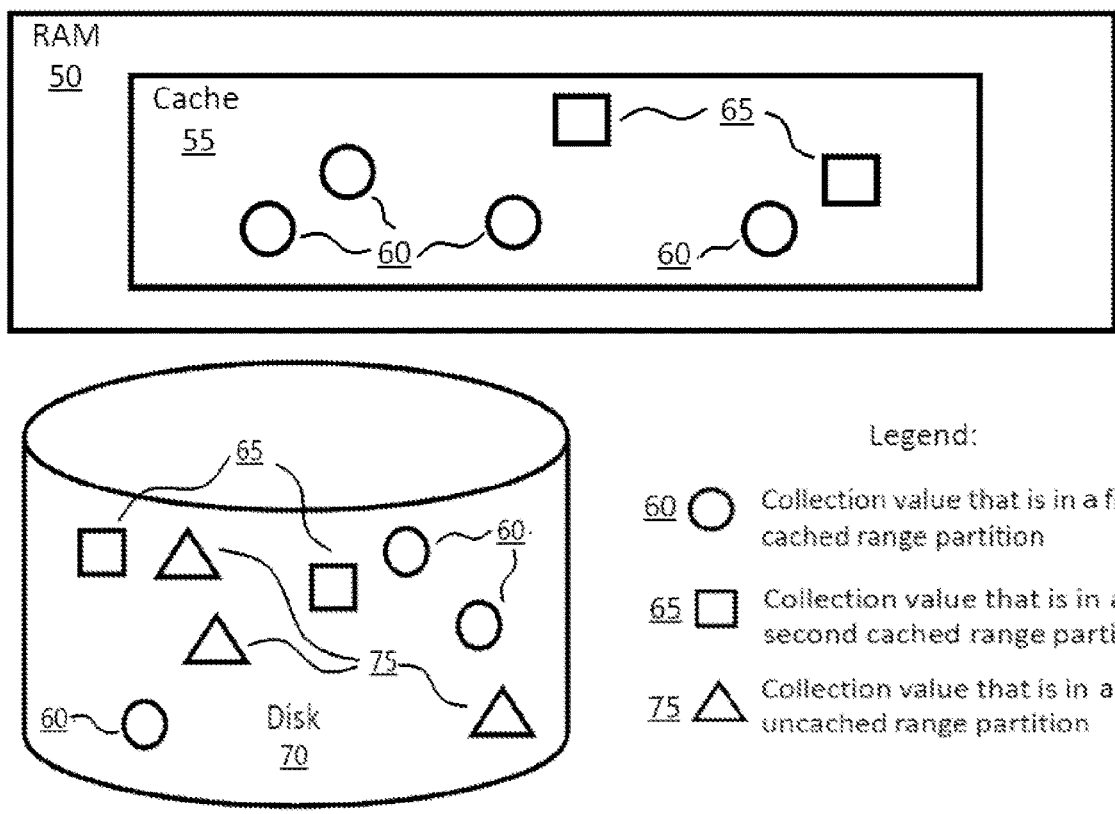
FIG. 4 illustrates a cache invariant of an embodiment of the system.

An example of a cache invariant is illustrated in FIG. 4, in which there are two cached range partitions (60) and (65) in RAM (50). The disk (70) contains all of the collection values, including those values (60) and (65) that are also in one of the cached range partitions and those values (75) that are in an uncached range partition.

The cache invariant enables the processor to search for a value in a far more efficient manner. An embodiment of such a search procedure is illustrated in the flowchart shown in FIG. 5. For values in a cached range partition, the search does not require any disk access, regardless of whether the search is a hit or a miss.

The system finds the range partition that contains value 'X' (100) and determines if the partition is cached or not (105).

In an embodiment, the system maintains a set of "partition definitions", which may comprise, for each partition, the partition endpoints (minimum and maximum values) and a flag that indicates whether the partition is cached or uncached. To find the partition that contains 'X' (100), the system iterates through the partition definitions and tests whether 'X' lies within each partition's endpoints. Because range partitions are disjoint and span the range of possible collection values, 'X' must be found to lie in exactly one partition. To determine whether the partition is cached (105), the system consults the cached/uncached flag for that partition definition.

If the partition is cached (i.e. the answer is 'yes' to query 105), it then looks to see if 'X' is found in the cache (110). If it is, then the answer to the search is 'yes', 'X' is in the cache and therefore, is also in the collection on disk (125). If 'X' is not in the cache, then 'X' is also not in the collection (120). Either way, there is no need to search the disk to determine whether 'X' is stored on the disk. That is, it has been ascertained whether the value 'X' is in the collection (on the disk) without actually searching the disk, thereby increasing the processing speed.

Where 'X' is in a non-cached partition (i.e. the answer to (105) is 'no'), the program instructs the processor to then search the disk to see if 'X' is present in the disk collection (115). It is only in this instance that the disk is searched.

As an example, suppose a full range is designated as numbers 1 to 100. Cached partitions may be designated with the ranges [1,25], [50,75] and [90,100], with uncached partitions designated with ranges [26,49] and [76,89]. Now, it is possible that not every number 1, . . . , 100 is actually in the collection on the disk. Suppose, for example, only even numbers are in the collection on the disk. Even numbers between [1,25], [50,75] and [90,100] will be in cached range partitions, whereas the remaining even numbers will be in uncached range partitions.

Suppose the program needs to determine if the number 59 is present. From its value (i.e. 59), the program determines that it is in the cached range partition of [50,75]. It then searches the cache and finds that it is not present. Thus, '59' is a miss—but there has been no need to search the disk, thus increasing the efficiency of the processing. Instead, only searching of the cache has taken place. The processor has thus found that 59 is not in the collection on disk, without actually searching the disk. Instead, it has searched the cache to arrive at this conclusion, thereby increasing the processing speed.

Now, suppose the program needs to see if the number 60 is present in the collection on disk. It will go through the same procedure, and this time, return with the answer 'yes' (i.e. a hit), by only searching the cache. Again, there has been no searching of the disk to determine that '60' is in the collection on disk, thus increasing the processing speed.

Now, suppose the program is asked to determine if the number 28 is in the collection. It determines that the range partition (i.e. [26,49]) to which the value belongs, is not cached. It then proceeds to search the disk and finds that 28 is present (i.e. a hit).

Finally suppose the program is required to find if the number 31 is present. It determines that the range partition (i.e. [26,49]) to which the value belongs, is not cached. It then proceeds to search the disk and finds that 31 is not present (i.e. a miss).

The above is a simple example but shows that there is no need to search the disk for every single value for which a search is requested. Instead, the first step of determining if the range partition (to which 'X' belongs) is cached or not, helps to avoid searching the disk. This increases the processing speed.

The system speeds up the process of determining whether a data value is in the collection (on disk) since, for some values, the searching procedure can determine whether the value is in the collection without looking at the disk. As described above, the determination can be made by looking only in the cache in computer RAM. Looking at computer RAM is faster than looking at computer disk.

The above procedure applies if the cache is located in any storage medium that is faster to access than the disk. For example, the cache can be in non-volatile memory as well.

Figure 5:
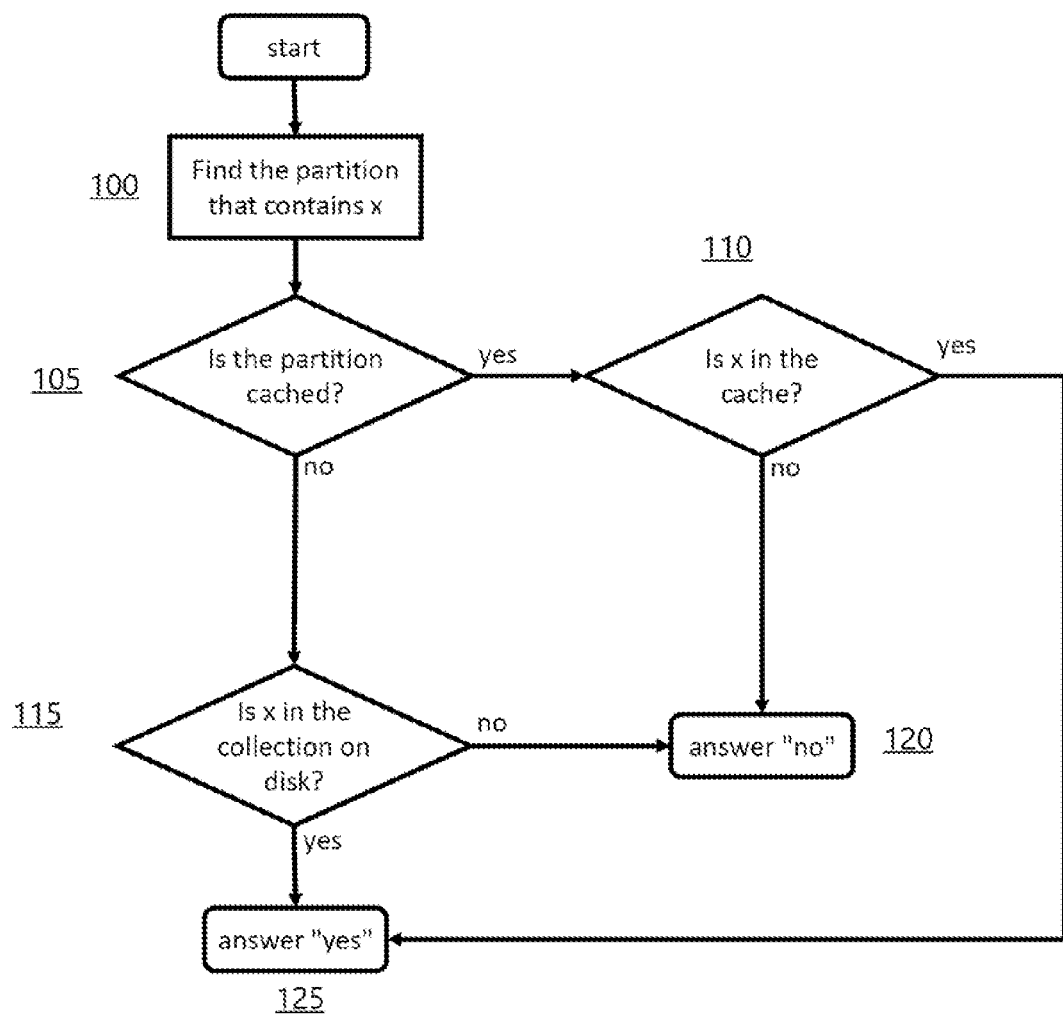
FIG. 5 illustrates a flowchart of a search procedure of an embodiment of the system.

If it is found that the particular value 'X' is not present in the collection (i.e. the answer is 'no' (120) in FIG. 5), it can be inserted in a manner such that the cache invariant is preserved.

Figure 6:
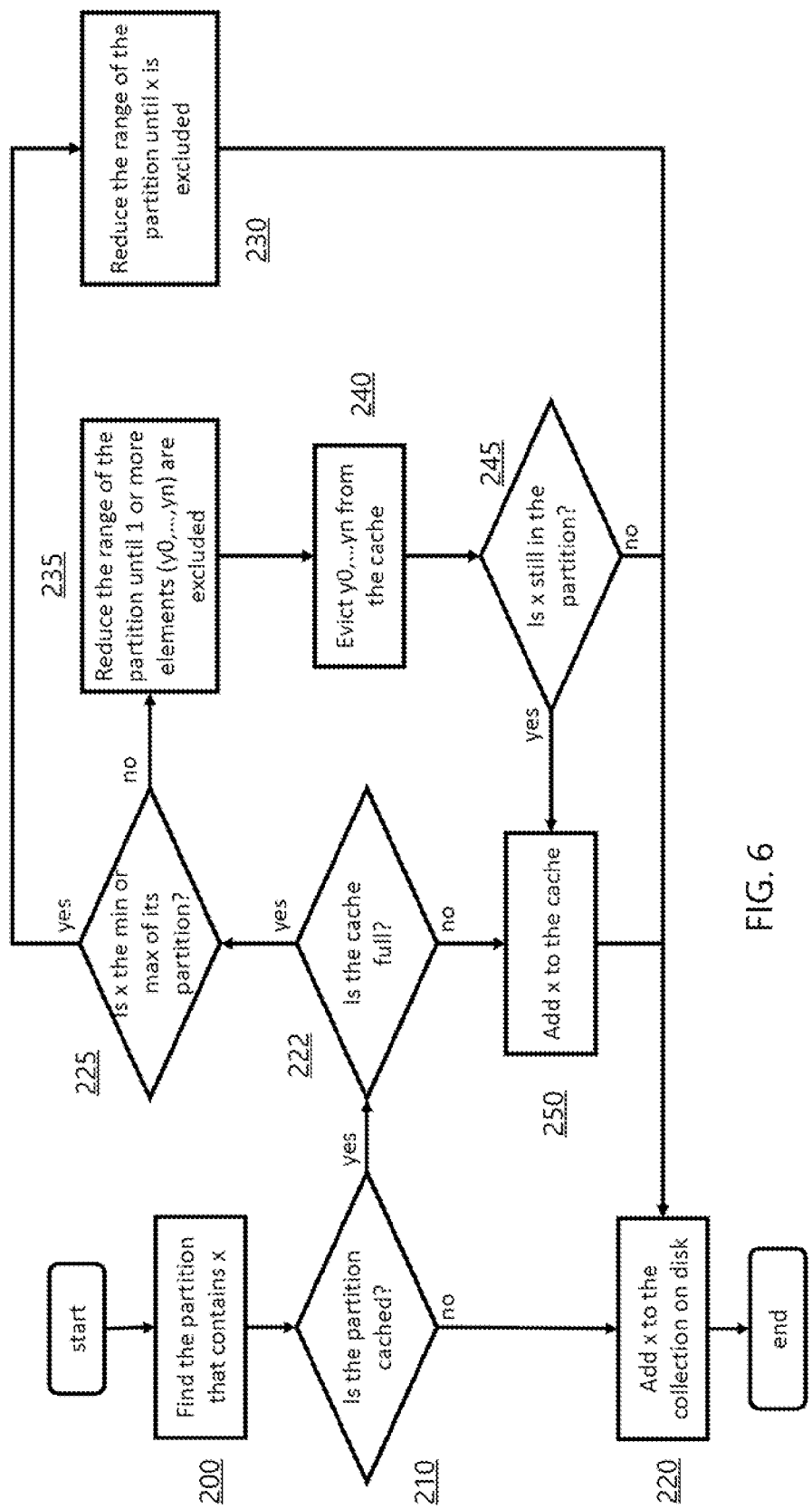
FIG. 6 illustrates a flowchart of an insertion procedure in some embodiments of the system.

FIG. 6 provides a flowchart of an embodiment of a system in which a value 'X' is inserted into the collection, after having determined that it is not present therein. As a precondition to the embodiment illustrated in FIG. 6, the program has already determined that 'X' in not in the collection. If the new value is in a cached range partition, but the cache is already full, then the range partitions are adapted to either exclude the new element or to make room for the new element by evicting another element from the cache.

The system first determines if 'X' is in a cached range partition or not (210). If it is not, then it writes 'X' to the disk collection (220). 'X' is not copied into the cache.

On the other hand, if 'X' is in a cached range partition, then the program determines if the cache is full (222). If it is not full, then 'X' is added to the cache (250), in addition to being added to the disk collection (220).

The following paragraphs describe one possible implementation of adapting the range partitions when the cache is full, as illustrated in FIG. 6. Other implementations are possible.

If the cache is full, then the program determines whether 'X' is one of the end-points of a cached partition range (225). If it is, then the range of the particular cached partition range is shortened (230) until 'X' is excluded. Then 'X' is written to the disk collection (220).

If, on the other hand, 'X' is not either the minimum or maximum value of the range partition, then its range is reduced until one or more elements are excluded (235). These one or more elements are evicted from the cache (240). The program then checks to see whether 'X' is still within the new range. If it is, then it is added to the cache (250), in addition to being added to the disk collection (220); if not, it is only written to the disk collection (220).

Where 'X' lies in a cached range partition, the cache is checked to see if it has space to accommodate 'X'. If it does not, the range of the partition is dynamic, and is adjusted such that 'X' is accommodated into the cache (and written on disk); or added only to the collection on disk (i.e., not into the cache). Once again, the step of searching through the disk is avoided, thereby increasing the processing speed and efficiency.

Figure 7:
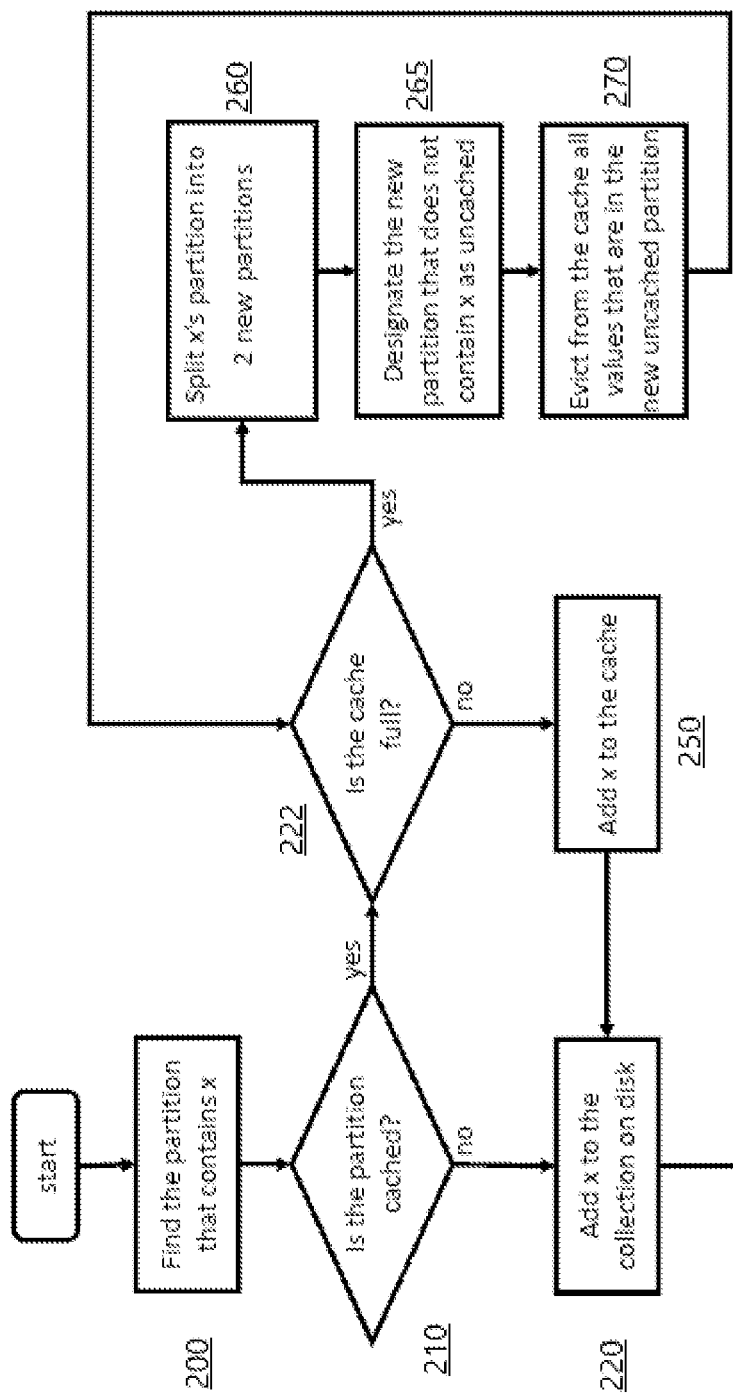
FIG. 7 illustrates a flowchart of an insertion procedure in some embodiments of the system.

FIG. 7 provides a flowchart of an embodiment of a system in which a value 'X' is inserted into the collection, after having determined that it is not present therein. As a precondition to the embodiment illustrated in FIG. 7, the program has already determined that 'X' in not in the collection. If the new value is in a cached range partition, but the cache is already full, then the range partitions are further divided such that the divided range partition that does not contain 'X' is uncached and the values therein are evicted from the cache.

As in FIG. 6, the system first determines if 'X' is in a cached range partition or not (210). If it is not, then it writes 'X' to the disk collection (220). 'X' is not copied into the cache.

On the other hand, if 'X' is in a cached range partition, then the program determines if the cache is full (222). If it is not full, then 'X' is added to the cache (250), in addition to being added to the disk collection (220).

The following paragraphs describe one possible implementation of adapting the range partitions when the cache is full, as illustrated in FIG. 7. Other implementations are possible.

If the cache is full, then the program divides the partition that should contain 'X' into two new partitions (260). The partition that does not contain 'X' is designated as uncached (265) and the values therein are evicted from the cache (270). The cache is then checked again to see if it is full (222), and steps (260), (265) and (270) repeated, if indeed the cache is full, until the cache is no longer full, at which point 'X' is added to the cache (250), and subsequently written to the collection on disk (220).

Where 'X' lies in a cached range partition, the cache is checked to see if it has space to accommodate 'X'. If it does not, the range of the partition is dynamic, and is reduced such that 'X' is accommodated into the cache (and written on disk). Once again, the step of searching through the disk is avoided, thereby increasing the processing speed and efficiency.

In some embodiments, range partitions may be adjusted (i.e. not necessarily reduced) in a manner such that the cached range partition to which 'X' belongs is not reduced.

In some embodiments, one or more of the range partitions can be adjusted.

In another embodiment, adjustment of range partitions may include the following steps: deletion of all of the range partitions; creation of a first new range partition that is as large as possible and contains 'X'; everything else falls into another new range partition; designation of the new partition that contains 'X' as cached, and the other new partition as uncached; and updating the contents of the cache to reflect the new range partitions. In such an embodiment, the new range partition that contains 'X' may be larger than its original range partition.

As an example, the collection range may be integers from 1 to 100, i.e. [1,100]. The cache size may be restricted to two (integer) values. The pre-existing range partitions can be [1, 50] and [51, 100], with both partitions cached. For a collection that consists of two values 27 and 97, each value is also cached; i.e. the entire collection is cached, so the cache is full. If 'X'=80, the processor has determined that 'X' is not on the disk (by ascertaining that it belongs to the cached range partition [51, 100]). In the aforementioned embodiment, X=80 can be inserted into the collection as follows. First, all of the pre-existing range partition definitions are deleted. A first new range partition may be defined as [1, 96]; 'X' lies in this new range partition which is designated as cached. A second range partition may be defined according to the rule {x|x is in [1, 100] AND x is not in [1, 96]}—that is, a range partition that includes all other values in the collection (i.e. "everything else."). This range partition is designated uncached. The value 97 is evicted from the cache, which now only contains one value: '27'. Since the cache can accommodate two values, it can now accommodate 'X'. The value of 'X' ('X'=80) is then inserted into the cache and into the collection on disk. The new cached range partition is [1,96].

In another embodiment, where there are multiple cached range partitions, adjustments thereof may include the following steps: switching all of the cached range partitions that don't contain 'X' to an uncached designation; evicting all of the values that lie in those partitions; and leaving the range partition that contains 'X' unchanged. In this embodiment, if enough cache space is freed by evicting values in the other range partitions, then the range partition containing 'X' may be increased, and additional values can be brought into the cache.

Figure 8:
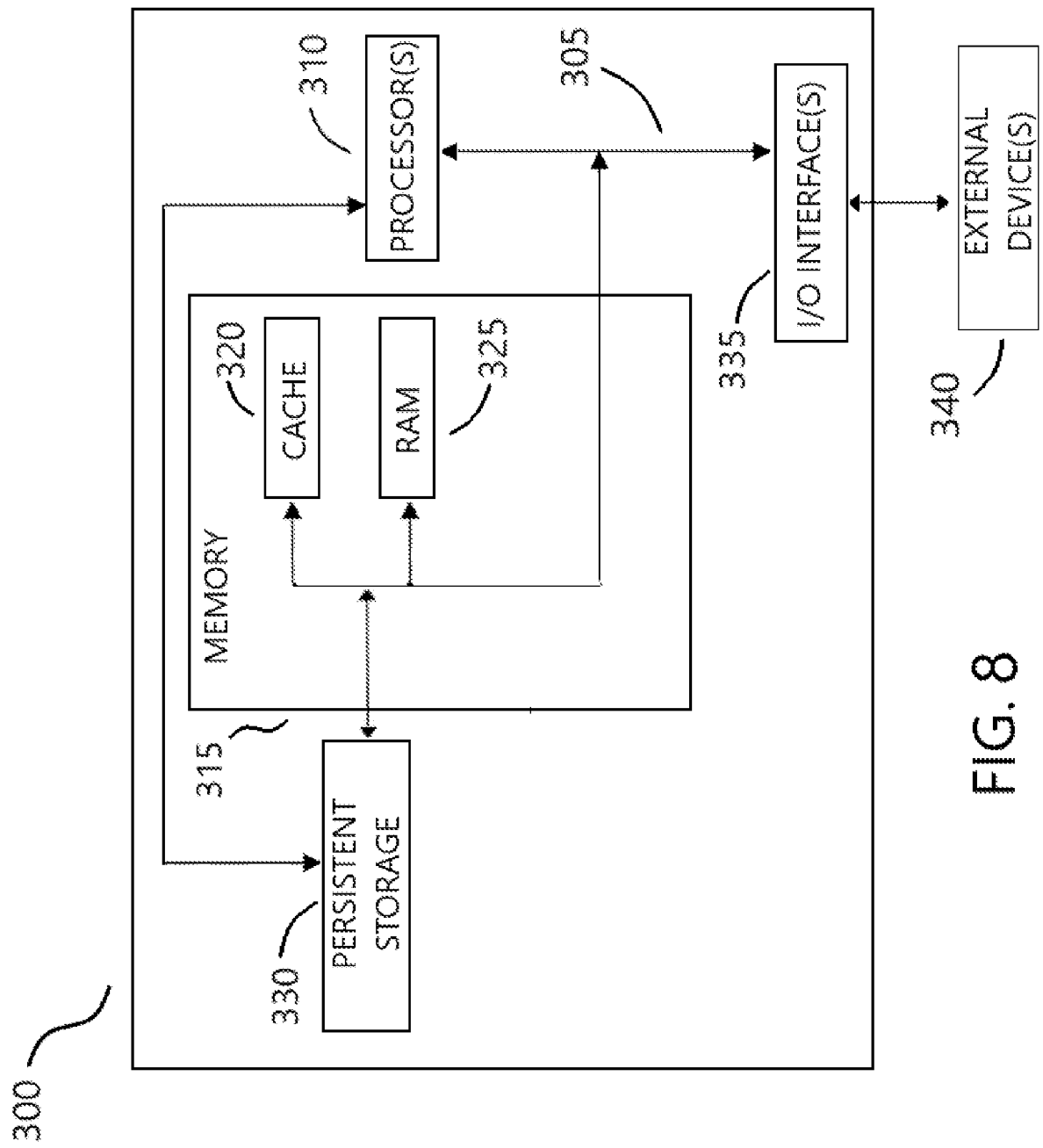
FIG. 8 illustrates a block diagram of an embodiment of the system.

FIG. 8 is a block diagram of an example computer system 300 suitable for implementing some embodiments. The illustration provided in FIG. 8 is only an illustration of one implementation and does not imply any limitations with regard to the environments in which different embodiments may be implemented.

In general, the components illustrated in FIG. 8 represent any electronic device capable of executing machine-readable program instructions. Examples of computer systems, environments, and/or configurations that may be represented by the components illustrated in FIG. 8 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

System 300 comprises a communications fabric 305; one or more processors 310; a system memory 315 which itself comprises a cache 320 and RAM 325; persistent storage 330; and one or more input/output interfaces 335 which are connected to one or more external devices 340.

Communications fabric 305 provides for communications between one or more processors 310, computer memory 315, persistent storage 330, and one or more input/output (I/O) interfaces 335. Communications fabric 305 can be implemented with any architecture designed for passing data and/or control information between processors (such as microprocessors, communications and network processors, etc.), system memory, peripheral devices, and any other hardware components within a system. For example, communications fabric 305 can be implemented with one or more buses.

Data and program files may be input to the computer system 300, which reads the files and executes the programs therein using one or more processors 310. There may be one or more processors 310, such that the computing system 300 comprises a single central-processing unit (CPU) or a plurality of processing units. The processors may be single core or multi-core processors. The computing system 300 may be a conventional computer, a distributed computer, or any other type of computer. The described technology is optionally implemented in software loaded in memory 315 or persistent storage 330.

Memory 315 and persistent storage 330 are computer-readable storage media. In some embodiments, memory 315 includes random access memory (RAM) 325 and cache 320. In general, memory 315 can include any suitable volatile or non-volatile computer-readable storage media. Software can be stored in persistent storage 330 for execution and/or access by one or more of the respective processors 310 via one or more memories of memory 315; or can be stored in memory 315.

Persistent storage 330 may include, for example, a plurality of magnetic hard disk drives. Alternatively, or in addition to magnetic hard disk drives, persistent storage 330 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 330 can also be removable. For example, a removable hard drive can be used for persistent storage 330. Other examples include optical and magnetic disks, thumb drives, and smart cards that are inserted into a drive for transfer onto another computer-readable storage medium that is also part of persistent storage 330.

One or more I/O interfaces 335 allow for input and output of data with other devices that may be connected to computer system 300. For example, I/O interface 335 can provide a connection to one or more external devices 340, such as a keyboard, computer mouse, touch screen, virtual keyboard, touch pad, pointing device, or other human interface devices. External devices 340 can also include portable computer-readable storage media such as, for example, thumb drives, portable optical or magnetic disks, and memory cards. I/O interface 335 can also connect to a display (not shown).

In an example implementation, the disclosed system and methods may be embodied by instructions stored in memory 315 and/or persistent storage 330 and executed by a CPU in a processor 310. Further, local computing system, remote data sources and/or services, and other associated logic represent firmware, hardware, and/or software which may be configured to adaptively distribute workload tasks to improve system performance.

The disclosed methods may be implemented using a general-purpose computer and specialized software (such as a server executing service software), and a special purpose computing system and specialized software (such as a mobile device or network appliance executing service software), or other computing configurations. In addition, program data, such as dynamic allocation threshold requirements and other information may be stored in memory 315 and/or persistent storage 330 and executed by processor 310.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

The invention claimed is:

1. A method for storing a data value onto a cache, the method comprising:

determining, by a processor, that a target range partition that encompasses the data value is cached, the target range partition being from among a plurality of disjointed range partitions;

determining, by the processor, that the data value is not present in the target range partition;

determining, by the processor, that if the cache is full:

a) dividing, by the processor, the range partition into a first partition and a second partition, the first partition containing the data value;

b) designating, by the processor, the second partition as uncached;

c) evicting, by the processor, from the cache all of the values that are in the second partition;

d) repeating, by the processor, steps (a), (b) and (c) if the cache is full; and e) copying, by the processor, the data value to the cache and to the first tier;

with:

the plurality of disjointed range partitions collectively encompassing a range of possible data values to be stored on a first tier of a storage hierarchy, the plurality of disjointed range partitions consisting of a subset of one or more cached range partitions and a subset of one or more uncached range partitions;

a collection of data values being stored on the first tier of the storage hierarchy, the collection of data values being partitioned into a subset of uncached data and a subset of cached data;

the subset of uncached data being placed into the one or more uncached range partitions; and the subset of cached data being placed into the one or more cached range partitions, the subset of cached data being copied into the cache, the cache residing on a second tier of the storage hierarchy, the second tier being faster than the first tier.

2. The method of claim 1, wherein if the cache has space, the method further comprises:

inserting, by the processor, the data value into the target partition range and copying the data value into the first tier.

3. The method of claim 1, wherein: the cache resides in the fastest tier of the storage hierarch.

4. The method of claim 1, wherein the collection of data values is stored on a disk.

5. The system of claim 1, wherein: the cache resides in the fastest tier of the storage hierarch.

6. The system of claim 1, wherein the collection of data values is stored on a disk.

7. The system of claim 1, wherein: the cache resides in the fastest tier of the storage hierarch.

8. The system of claim 1, wherein the collection of data values is stored on a disk.

9. A computer system for storing a data value onto a cache, the system comprising a processor coupled to a computer-readable memory unit, the memory unit comprising instructions that when executed by the processor, configure the system to:

determine, by the processor, that a target range partition that encompasses the data value is cached, the target range partition being from among the plurality of disjointed range partitions;

determine, by the processor, that the data value is not present in the target range partition;

determine, by the processor, that if the cache is full:

a) divide, by the processor, the range partition into a first partition and a second partition, the first partition containing the data value;
b) designate, by the processor, the second partition as uncached;
c) evict, by the processor, from the cache all of the values that are in the second partition;
d) repeat, by the processor, steps (a), (b) and (c) if the cache is full; and
e) copy, by the processor, the data value to the cache and to the first tier;

with:
the plurality of disjointed range partitions collectively encompassing a range of possible data values to be stored on a first tier of a storage hierarchy, the plurality of disjointed range partitions consisting of a subset of one or more cached range partitions and a subset of one or more uncached range partitions;
a collection of data values being stored on the first tier of the storage hierarchy, the collection of data values being partitioned into a subset of uncached data and a subset of cached data;
the subset of uncached data being placed into the one or more uncached range partitions; and
the subset of cached data being placed into the one or more cached range partitions, the subset of cached data being copied into the cache, the cache residing on a second tier of the storage hierarchy, the second tier being faster than the first tier.

10. The system of claim 9, wherein if the cache has space, the system is further configured to:
insert, by the processor, the data value into the target partition range and copying the data value into the first tier.

11. A computer program product for storing a data value onto a cache, the computer program product comprising a non-transitory computer readable storage device including instructions that when executed by a processor of a computing device, cause the computing device to:
determine, by the processor, that a target range partition that encompasses the data value is cached, the target range partition being from among the plurality of disjointed range partitions;
determine, by the processor, that the data value is not present in the target range partition;
determine, by the processor, that if the cache is full:
a) divide, by the processor, the range partition into a first partition and a second partition, the first partition containing the data value;
b) designate, by the processor, the second partition as uncached;
c) evict, by the processor, from the cache all of the values that are in the second partition;
d) repeat, by the processor, steps (a), (b) and (c) if the cache is full; and
e) copy, by the processor, the data value to the cache and to the first tier;

with:
the plurality of disjointed range partitions collectively encompassing a range of possible data values to be stored on a first tier of a storage hierarchy, the plurality of disjointed range partitions consisting of a subset of one or more cached range partitions and a subset of one or more uncached range partitions;
a collection of data values being stored on the first tier of the storage hierarchy, the collection of data values being partitioned into a subset of uncached data and a subset of cached data;
the subset of uncached data being placed into the one or more uncached range partitions; and
the subset of cached data being placed into the one or more cached range partitions, the subset of cached data being copied into the cache, the cache residing on a second tier of the storage hierarchy, the second tier being faster than the first tier.

12. The computer program product of claim 11, wherein if the cache has space, the instructions that when executed by the processor, further configure the computing device to:
insert, by the processor, the data value into the target partition range and copying the data value into the first tier.

* * * * *